US012683714B2

(12) United States Patent
Ladkani et al.

(10) Patent No.: US 12,683,714 B2
(45) Date of Patent: Jul. 14, 2026

(54) SYSTEMS AND METHODS TO INITIATE DEVICE RECOVERY

(71) Applicant: Microsoft Technology Licensing, LLC, Redmond, WA (US)

(72) Inventors: Neeraj Ladkani, Bothell, WA (US); Mark Andrew Shaw, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 115 days.

(21) Appl. No.: 17/566,591

(22) Filed: Dec. 30, 2021

(65) Prior Publication Data

US 2023/0216607 A1 Jul. 6, 2023

(51) Int. Cl.
H04L 1/00 (2006.01)
G06F 13/42 (2006.01)

(52) U.S. Cl.
CPC ........ H04L 1/0072 (2013.01); G06F 13/4282 (2013.01); H04L 1/0033 (2013.01); H04L 1/0036 (2013.01)

(58) Field of Classification Search
CPC ... H04L 1/0072; H04L 1/0033; H04L 1/0036; G06F 13/4282; G06F 11/0748; G06F 11/0751; G06F 11/3006; G06F 11/3031; G06F 11/0793; G06F 2213/0016; G06F 1/24; G06F 11/2005; G06F 11/1441; G06F 11/2023; G06F 11/1438; G06F 11/2007
See application file for complete search history.

(56) References Cited

U.S. PATENT DOCUMENTS

| | | | |
|---|---|---|---|
| 8,346,912 B2 | 1/2013 | Bhadri et al. | |
| 9,921,852 B2 | 3/2018 | Chu et al. | |
| 9,998,359 B2 | 6/2018 | Itkin et al. | |
| 10,540,232 B2 | 1/2020 | Brown et al. | |
| 11,126,517 B2 | 9/2021 | Lee et al. | |
| 11,411,753 B2 * | 8/2022 | Ballard | H04L 45/70 |
| 2017/0102889 A1 * | 4/2017 | Lobo | G06F 11/1415 |
| 2018/0203768 A1 | 7/2018 | Huang et al. | |
| 2019/0220340 A1 | 7/2019 | Chou et al. | |
| 2020/0305300 A1 * | 9/2020 | Lin | G06F 11/0793 |
| 2021/0011735 A1 | 1/2021 | Edwards et al. | |
| 2021/0103659 A1 | 4/2021 | Ladkani et al. | |

OTHER PUBLICATIONS

"Reset the BMC to Defaults Without Power-cycling the Server Through the Intel® Remote Management Module (Intel® RMM4) and Integrated Web Console", Retrieved from: https://www.intel.com/content/www/us/en/support/articles/000029866/server-products/serverboards.html, Retrieved on: Oct. 26, 2021, 3 Pages.

(Continued)

*Primary Examiner* — Mark D Featherstone
*Assistant Examiner* — Rong Tang
(74) *Attorney, Agent, or Firm* — Ray Quinney & Nebeker P.C.; Paul N. Taylor

(57) ABSTRACT

The methods and systems provide remote device recovery using a sideband communication path in response to an error occurring in the device. A management entity sends a sideband communication using the sideband communication path to a logic circuit in communication with the device. The logic circuit initiates the recovery of the device.

20 Claims, 6 Drawing Sheets

(56)  References Cited

OTHER PUBLICATIONS

Frazelle, Jessie, "Opening Up the Baseboard Management Controller", In Journal of Communications of the ACM, vol. 63, No. 2, Feb. 2020, pp. 38-40.

Kennedy, Patrick, "Explaining the Baseboard Management Controller or BMC in Servers", Retrieved from: https://www.servethehome.com/explaining-the-baseboard-management-controller-or-bmc-in-servers/, Sep. 27, 2018, 8 Pages.

"International Search Report and Written Opinion Issued in PCT Application No. PCT/US22/050333", Mailed Date: Mar. 17, 2023, 14 Pages.

* cited by examiner

100

BMC *102*   EMAC 104    RGMII *108*    PHY SERDES *106*    SERDES    Port0

SYSTEMS AND METHODS TO INITIATE DEVICE RECOVERY

BACKGROUND

Prior management network solutions involve a Baseboard Management Controller (BMC) with an embedded ethernet Media Access Control (EMAC) communicating to a management network through a physical layer (PHY) Serializer/Deserializer (SERDES) controller. These solutions are employed widely across the industry. However, if the BMC fails in these solutions, the connection to the BMC is lost over the management network and remote recovery of the node is very difficult or impossible without physical access to the server. Often these servers must be pulled from service and their motherboards returned for rework.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations relate to a system. The system includes a management entity; a controller communicatively coupled to the management entity via a first communication path, wherein the management entity remotely monitors the controller to ensure that the controller is operating properly; and a logic circuit communicatively coupled to the management entity and the controller via a sideband communication path and, wherein the logic circuit is configured to: receive a sideband communication from the management entity via the sideband communication path to initiate a control function on the controller, wherein the controller is malfunctioning, inoperable, or non-responsive to communications from the management entity via the first communication path; and initiate the control function.

Some implementations relate to a system. The system includes a management entity; a baseboard management controller (BMC) communicatively coupled to the management entity via a first communication path; and a logic circuit communicatively coupled to the BMC and the management entity via a sideband communication path, wherein the logic circuit is configured to: receive a communication from the management entity via the sideband communication path to initiate a control function on the BMC, wherein an error occurred on the BMC; and initiate the control function on the BMC.

Some implementations relate to a method. The method includes receiving, at a logic circuit, a sideband communication from a management entity to initiate a control function for a baseboard management controller (BMC) on a sideband communication path that is separate from a primary communication path between the management entity and the BMC. The method includes initiating, by the logic circuit, the control function on the BMC.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Previous management network solutions involve a Baseboard Management Controller (BMC) communicating to a management network through a PHY (or SERDES controller). The BMC is a specialized microcontroller that is embedded on the motherboard of a host computing device. BMCs allow system administrators to perform various tasks remotely and/or remotely monitor the operations of the host computing device. For example, a system administrator remotely communicates with a BMC to take corrective actions, such as resetting or power cycling a host computing device. These management network solutions are employed widely across the industry. However, if the BMC fails in these solutions, the connection to the BMC is lost over the management network and remote recovery of the node is very difficult or impossible without physical access to the server.

Figure 1:
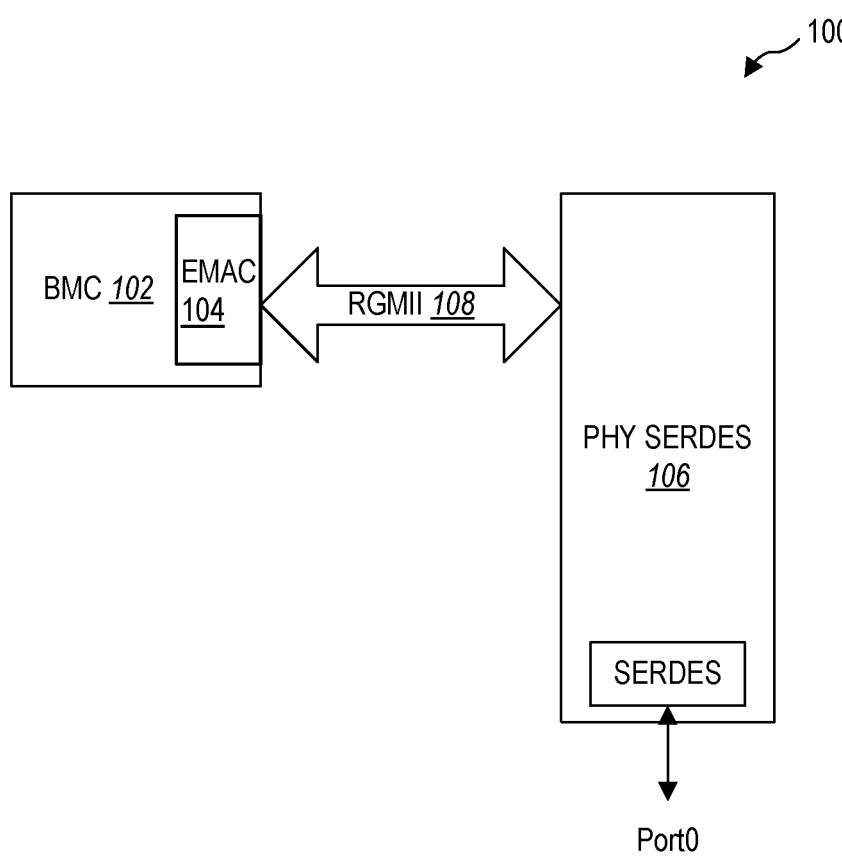
FIG. 1 illustrates an example of a previous system for management networks.

FIG. 1 illustrates an example of a prior art system 100 for management networks. The system 100 employs a BMC 102 with an embedded EMAC 104 communicating with a PHY SERDES 106 through a reduced media-independent interface (RMII) 108. The EMAC 104 is communicating to a management network through the PHY SERDES 106. In the system 100, if the BMC 102 is non-functional, communication over the management network is lost and recovery of the BMC 102 requires physical intervention to the server. Often the servers must be pulled from service and the server's motherboards returned or reworked. As such, any customer workloads being processed by the server are lost.

The present disclosure provides systems and methods that initiate a remote recovery of a device when an error occurs on the device. A recovery includes resetting a device to a normal state, restarting a device, updating the firmware, and/or returning the firmware of the device to a previously known good state or a previous firmware version. One example of an error includes an unresponsive device. Another example of an error includes incorrect operation. In some embodiments, the device is a BMC. The systems and methods enable a sideband (e.g., secondary) communication channel that is separate from the EMAC of the BMC but utilizes the same management network. The sideband communication channel allows remote access to a logic circuit in communication with the BMC that is used to recover the BMC (e.g., return the BMC firmware to a previously known good state and/or reset the BMC to a normal state). The logic circuit initiates the recovery of the BMC based on the information received in a control signal from the management entity.

In some embodiments, the systems and methods use a Network Interface Controller (NIC) that supports sideband network connectivity to add a backup (e.g., second) network connection that can be used to recover the BMC firmware regardless of the functional state of the BMC. By replacing the PHY SERDES controller that is used in prior systems (e.g., system 100) with a NIC that employs an internal EMAC and adding a logic circuit, the systems and methods of the present disclosure create a sideband connection to the management network independent of the BMC. Moreover, the present disclosure provides a deterministic method for recovering nodes with faulted BMCs.

One technical advantage of the systems and the methods disclosed herein is to initiate a remote recovery of a BMC when an error occurs on the BMC. The systems and methods use a sideband communication path to a logic circuit in communication with the BMC to send a sideband communication to the logic circuit to initiate a control function on the BMC. The logic circuit initiates the control function on the BMC to reset the BMC or recover the BMC based on the information in the sideband communication. As such, the systems and methods of the present disclosure strategically recover or reset the plurality of BMCs with minimal interruption.

Figure 2:
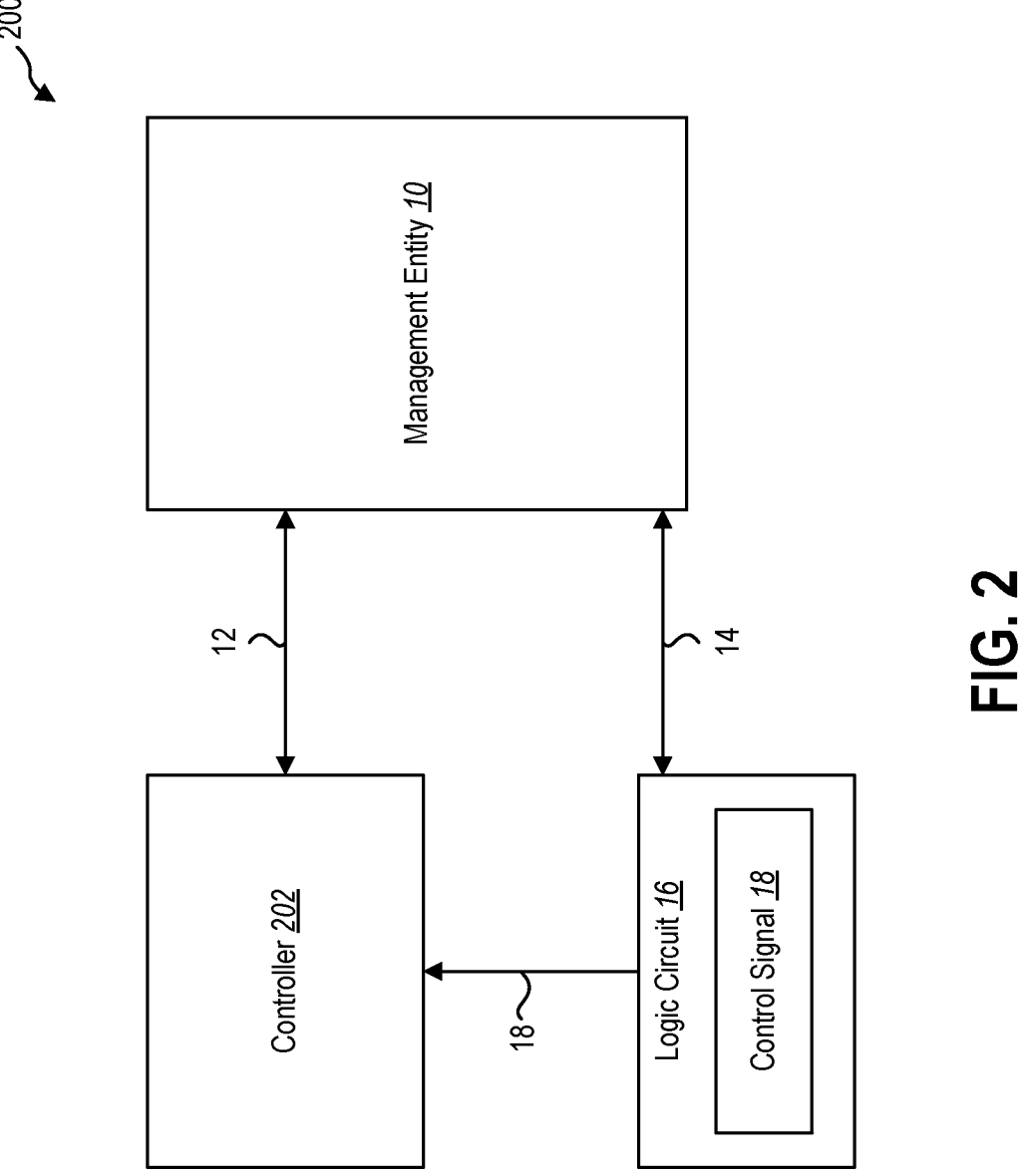
FIG. 2 illustrates an example system for device recovery in accordance with embodiments of the present disclosure.

Referring now to FIG. 2, illustrated is an example system 200 for device recovery. The system 200 includes a controller 202 in communication with a management entity 10 via a primary communication path 12. The management entity 10 remotely monitors the controller 202 to ensure that the controller 202 is operating properly. The management entity 10 monitors the controller 202 and performs various tasks remotely on the controller 202. In some implementations, the management entity 10 is a NIC. In some implementations, the controller 202 is a BMC. In some implementations, a device includes the controller 202. Example devices include internet of things (IoT) devices, servers, and/or devices in a network.

The primary communication path 12 is a primary communication path between the management entity 10 and the controller 202. The management entity 10 receives telemetry information (e.g., various system parameters) from the controller 202 via the primary communication path 12. In addition, the management entity 10 sends commands for the controller 202 to perform different actions via the primary communication path 12. In some embodiments, a single management entity 10 is used to manage a plurality of devices including the controller 202.

In some embodiments, an error occurs on the controller 202 that results in the controller 202 being unable to communicate with the management entity 10 via the primary communication path 12, the controller 202 operating incorrectly (e.g., inoperable), and/or the controller 202 being non-responsive.

If an error occurs on the controller 202 and the controller 202 is unable to communicate with the management entity 10 via the primary communication path 12 and/or the controller 202 is non-responsive, the management entity 10 sends a sideband communication to a logic circuit 16 to initiate control signals 18 for the controller 202 through the logic circuit 16 using a sideband communication path 14. The sideband communication path 14 is a redundant communication path from the management entity 10 to the controller 202 through the logic circuit 16. The sideband communication path 14 allows the management entity 10 to communicate with the controller 202 via the logic circuit 16 if the primary communication path 12 is unavailable and/or if the controller 202 is non-responsive or unable to communicate with the management entity 10 via the primary communication path 12.

In some embodiments, the logic circuit 16 performs logical operations on input signals received from, for example, the management entity 10. In some embodiments, the logic circuit 16 uses one or more logic gates to perform operations on the input signals. In some embodiments, the logic circuit 16 is a field programmable gate array (FPGA). In some embodiments, the logic circuit 16 is discreet logic for a specific functionality. In some embodiments, the logic circuit 16 is able to put the controller 202 into a factory default mode.

As illustrated in FIG. 2, the logic circuit 16 receives a sideband communication with control signals 18 from the management entity 10 and communicates the control signals 18 to the controller 202. In some embodiments, the control signal 18 is a recovery signal to recover the controller 202. For example, recovering the controller 202 includes rolling back the firmware of the controller 202 to a former good state. In some embodiments, the control signal 18 is a reset signal on a hardware pin to change a state of the hardware pin to reset the device. In some embodiments, the control signal 18 restarts the device. In some embodiments, the logic circuit 16 initiates a control function on the controller 202 based on the information in the control signals 18. In some embodiments, the control function is a recovery function that initiates a recovery of the device. In some embodiments, the control function initiates a reset of the device. In some embodiments, the control function places the device in a safe mode or returns the device to a last known good state of the device. In some embodiments, the control function restarts the device. As such, the management entity 10 remotely recovers the controller 202 when the controller 202 is operating incorrectly (e.g., inoperable) or unresponsive. In some embodiments, the recovery of the controller 202 is automatic based on the detection of the error state of the controller 202, or is caused by a user instruction.

Accordingly, the system 200 supports a sideband communication path 14 to add a redudant (e.g., a backup) network connection that is separate from the primary communication path 12, providing remote access to the logic circuit 16 that allows the controller 202 to be recovered regardless of the functional state of the controller 202.

One example use case of the present disclosure includes a datacenter with a plurality of servers running customer workloads. One of the servers includes a BMC that has glitched and is causing the fans on the server controlled by the BMC to continuously run at a maximum speed. As such, the server is drawing more power than is necessary and causing acoustic issues in the server rack. The server is still processing the customer workloads properly, however, the BMC is providing incorrect thermal control for the server. Similarly, a BMC that is processing customer workloads but not running the fans on the server would run the risk of thermally damaging the server hardware. Previous systems would have required a reset of the whole server by removing the power and losing the customer workloads being processed on the server. The methods and systems of the present disclosure send a control signal to the BMC using the sideband connection to the logic circuit so that the logic circuit initiates resetting the BMC to a normal state or recovering a last known good state without interrupting the customer workloads being processed by the server. As such, the methods and systems of the present disclosure allow the BMC to be recovered without dropping the current workloads on the server.

Another example use case of the present disclosure includes a datacenter with thousands of servers running customer workloads. A plurality of the servers have BMCs that are not providing telemetry reports for the customer workloads that the plurality of servers are running. The remote manager is unable to receive the telemetry data (e.g., the power usage by the servers, the thermal usage of the servers, an amount of processing power used by the virtual machines operating on the servers, or operating system status) from the BMCs. Without the telemetry data, the remote manager is unable to perform load balancing between the servers, which may result in a system wide problem at the datacenter. The methods and systems of the present disclosure identify the plurality of BMCs that are failing to provide telemetry reports and send control messages to the logic circuits in communication with plurality of BMCs using a sideband connection to the logic circuits. The logic circuits then initiate a recovery of the plurality of BMCs based on the information in the sideband communication, while maintaining the customer workloads on the plurality of servers.

Figure 3:
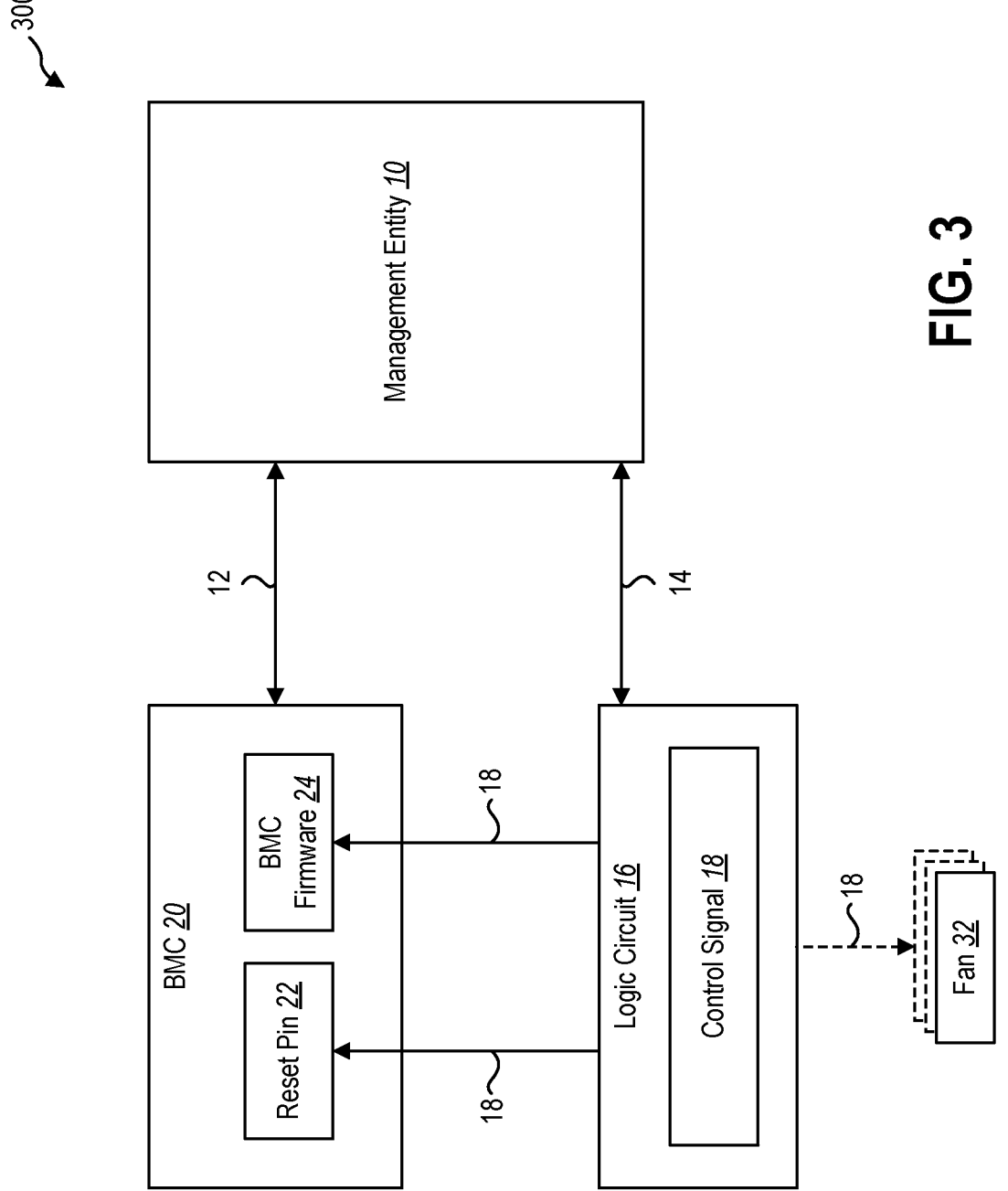
FIG. 3 illustrates an example system for BMC recovery in accordance with embodiments of the present disclosure.

Referring now to FIG. 3, illustrated is an example system 300 for BMC recovery. The system 300 includes a BMC 20 in communication with a management entity 10 via a primary communication path 12. The BMC 20 is a specialized microcontroller that is embedded on the motherboard of a computing device. One example of such a computing device includes a server in a cloud computing system. The BMC 20 allows system administrators to perform various tasks remotely on the computing devices and/or remotely monitor the operating conditions of the computing device. For example, a system administrator may use the management entity 10 to remotely communicate with the BMC 20 to take corrective actions, such as resetting or power cycling a computing device. The system administrator may also use the management entity 10 to remotely communicate with the BMC 20 to receive various system parameters (e.g., temperature, cooling fan speeds, power status, and operating system status) of the computing device.

The primary communication path 12 is a primary communication path between the management entity 10 and the BMC 20 via a network. In some embodiments, the primary communication path 12 is a peripheral component interconnect express (PCIe) link. The management entity 10 receives telemetry information (e.g., various system parameters) from the BMC 20 via the primary communication path 12. In addition, the management entity 10 sends commands (e.g., corrective actions) to the BMC 20 via the primary communication path 12. In some embodiments, the management entity 10 monitors a plurality of BMCs including the BMC 20. As such, a single management entity 10 may be used to manage a plurality of BMCs including the BMC 20.

The management entity 10 is also in communication with a logic circuit 16 via a sideband communication path 14. In some embodiments, the management entity 10 is a NIC. In such embodiments, the NIC includes a plurality of communication paths, including the primary communication path 12 with the BMC 20 and the sideband communication path 14 with the logic circuit 16.

In some embodiments, an error occurs on the BMC 20 and the BMC 20 is unable to communicate with the management entity 10 via the primary communication path 12, the BMC 20 is unresponsive, and/or the BMC 20 is operating incorrectly. One example error includes a processor managed by the BMC 20 is deadlocked and the BMC 20 is unable to perform processing operations (e.g., thermal management of the system, diagnostic reports of the system). Another example error includes BMC firmware 24 operating incorrectly (e.g., the flash memory is operating incorrectly). Another example error includes the BMC 20 being unable to provide telemetry information on various system parameters to the management entity 10. Another example error includes the BMC 20 being unable to boot because the kernel is unable to complete the boot process.

If an error occurs on the BMC 20 (e.g., the BMC 20 is non-responsive or performing incorrectly) and/or the BMC 20 is unable to communicate with the management entity 10 via the primary communication path 12, the management entity 10 sends the control signals 18 for the BMC 20 to the logic circuit 16 using the sideband communication path 14. The sideband communication path 14 is a redundant communication path from the management entity 10 to the BMC 20 through the logic circuit 16. The sideband communication path 14 allows the management entity 10 to communicate with the BMC 20 if the primary communication path 12 is unavailable and/or if an error occurs on the BMC 20. In some embodiments, the sideband communication path 14 is a customized communication path between the management entity 10 and the logic circuit 16. In some embodiments, the sideband communication path 14 is less complex as compared to the primary communication path 12.

The logic circuit 16 receives control signals 18 from the management entity 10 and communicates the control signals 18 to the BMC 20. In some embodiments, the logic circuit 16 initiates a control function on the BMC 20 based on the information in the control signals 18. In some embodiments, the control signal 18 is a recovery signal to recover the BMC 20 and the logic circuit 16 initiates a recovery function on the BMC 20. In some embodiments, the logic circuit 16 sends the control signal 18 to a reset pin 22 on the BMC 20 to reset the BMC 20 (e.g., by changing the state of the reset pin 22 from low to high or vice versa). By changing the state of the reset pin 22, the logic circuit 16 resets the BMC 20 to a normal state without physical access to the BMC 20. In some embodiments the logic circuit 16 sends the control signal 18 to restart the BMC 20. As such, the management entity 10 is able to remotely recover the BMC 20 in response to an error occurring on the BMC 20 (e.g., the BMC 20 becoming inoperable, operating incorrectly, or unresponsive).

In some embodiments, the logic circuit 16 sends the control signal 18 to the BMC 20 to update or reset the BMC firmware 24, or recover to the BMC firmware 24 to a last known good state. One example includes the logic circuit 16 sending the control signal 18 to the BMC 20 to initiate a reset of the BMC firmware 24 to an original version of the code and/or configuration for the BMC 20. Another example includes the logic circuit 16 sending the control signal 18 to the BMC 20 to initiate operation of the BMC firmware 24 in safe mode. Another example includes sending the control signal 18 to the BMC 20 to restore the BMC firmware 24 to a last known good state or configuration of the BMC 20. Another example includes sending the control signal 18 to the BMC 20 to update the BMC firmware 24 to a newer version. Another example includes sending the control signal 18 to the BMC 20 to restore the firmware to an earlier version.

As such, the system 300 provides a remote recovery mechanism for the BMC 20 from the management entity 10 using the sideband communication path 14 to the BMC 20 through the logic circuit 16 if an error occurs on the BMC 20 and/or if the BMC 20 becomes unresponsive. In some embodiments, the recovery of the BMC 20 is automatic based on the detection of the error state of the BMC 20, or is caused by a user instruction. The system 300 also provides a remote recovery mechanism for the BMC 20 from the management entity 10 if the primary communication path 12 is unavailable by using a sideband communication path 14 to the BMC 20 through a logic circuit 16.

In some embodiments, the control signal 18 initiates or causes initiation of one or more control operations on the system (e.g., power management, thermal management, or system diagnostics). For example, the control signal 18 may initiate a change in cooling fan speeds on the computing device. In some embodiments, the control signal 18 initiates a diagnostic function on the system. For example, the diagnostic function identifies performance issues of system.

Further, in some embodiments, the logic circuit 16 sends the control signal 18 directly to other devices of the system 300 hosting the BMC 20 and the logic circuit 16. In some embodiments, the logic circuit 16 sends the control signal 18 directly to other components of the computing device hosting the BMC 20 and the logic circuit 16. One example includes the logic circuit 16 sending the control signal 18 to fans 32 on the computing device to control the operation speed of the fans 32. In such embodiments, the logic circuit 16 acts as a spare BMC by sending a control signal 18 directly to the fans 32, e.g., to prevent thermal damage to sensitive components, while the BMC 20 is operating incorrectly or non-responsive.

Figure 4:
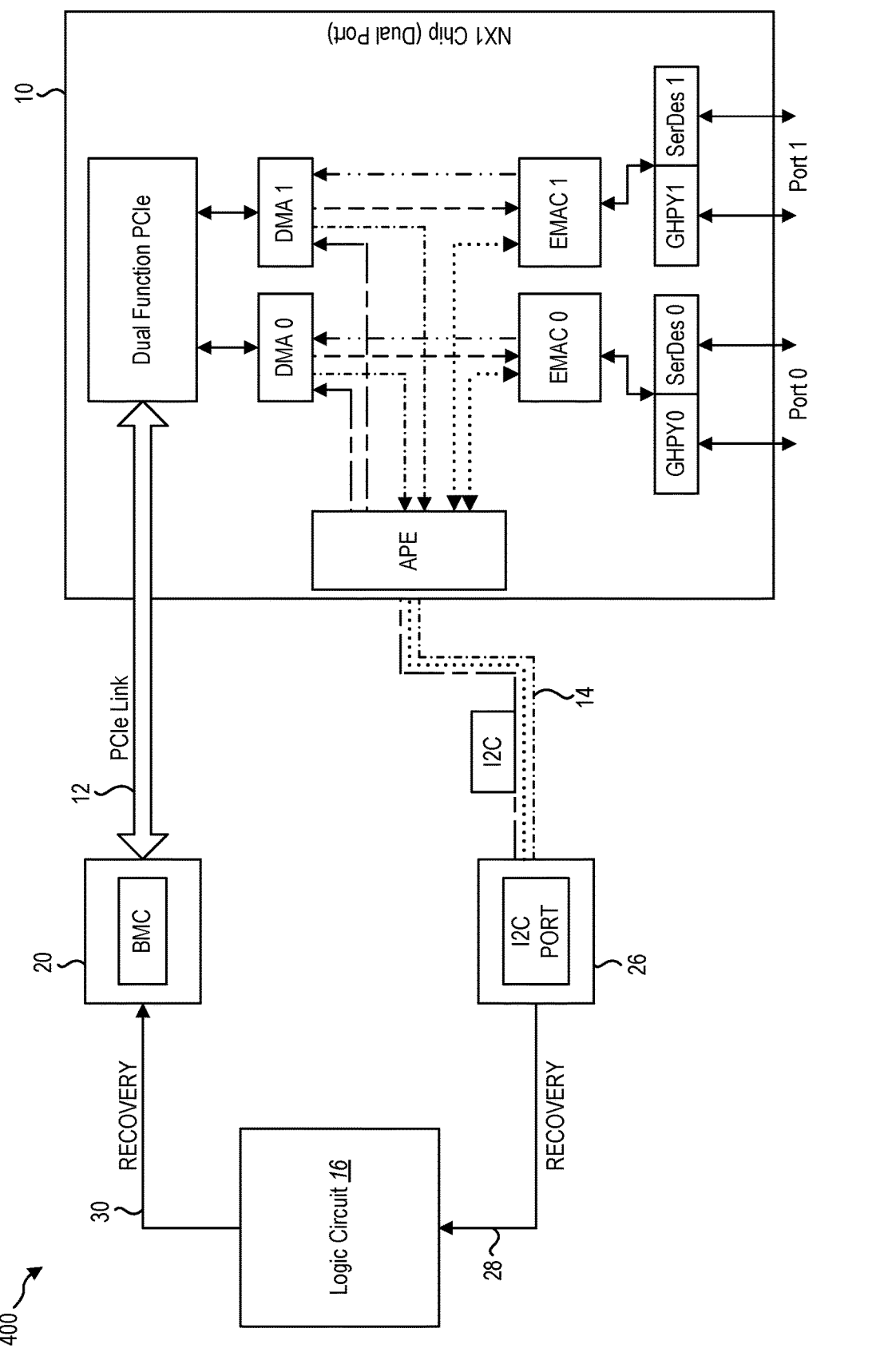
FIG. 4 illustrates an example system for BMC recovery using a network interface controller (NIC) in accordance with embodiments of the present disclosure.

Referring now to FIG. 4, illustrated is a system 400 for remote recovery of a BMC 20 using a NIC 10. The system 400 includes a BMC 20 in communication with the NIC 10 that has dual communication paths. The NIC 10 is configured to perform management operations with respect to the BMC 20. The NIC 10 has a first communication path 12 with the BMC 20. The first communication path 12 is a primary communication path between the BMC 20 and the NIC 10. In some embodiments, the first communication path 12 is a PCIe link.

The NIC 10 also has a sideband communication path 14 that is a sideband connection to the logic circuit 16. In some embodiments, the sideband communication path 14 is a network controller sideband interface (NC-SI) connection. In some embodiments, the sideband communication path 14 is an Inter-Integrated Circuit (I2C) connection. I2C connections are commonly used between processors and endpoints. The I2C connection includes an I2C port 26 in communication with the logic circuit 16. The I2C port 26 sends a recovery command 28 for the BMC 20 to the logic circuit 16.

In some embodiments, the sideband communication path allows remote access to a logic circuit that sends a control signal to other systems on the server to recover the other systems. One example use case includes a server with a BMC that has an error (e.g., the BMC is unresponsive) and a plurality of fans on the server operating at an incorrect speed. The logic circuit sends a control message directly to the fans based on the information received in the sideband communication to orchestrate the fans to operate at a specified speed for the server. As such, the logic circuity acts as a spare BMC by sending a control signal to the fans while the BMC is inoperable.

In some embodiments, the logic circuit 16 is a processor. In some embodiments, the logic circuit 16 is a I2C general-purpose Input/Output (GPIO). In some embodiments, the logic circuit 16 functions as a secondary controller (e.g., a spare BMC).

In the event the BMC 20 fails and/or communication to the BMC 20 over the management network is lost (e.g., communication is unavailable over the first communication path 12 or the BMC 20 is non-responsive), the sideband port on the NIC 10 is used to communicate with the logic circuit 16 (e.g., via the sideband communication path 14) to recover the BMC 20.

The logic circuit 16 initiates a recovery of the BMC 20 by sending a recovery command 30 to the BMC 20. In some embodiments, the recovery command 30 asserts a hardware reset of the BMC 20. In some embodiments, the recovery command 30 reverts the BMC 20 to a known good boot image or directing a network boot to a known good image for the BMC 20.

As such, the system 400 supports a sideband connection as a secondary or backup connection that is separate from the primary communication path 12 between the BMC 20 and the NIC 10, but uses the same management network, and thus, allows remote access via the logic circuit 16 to recover the BMC 20 regardless of the functional state of the BMC 20.

Figure 5:
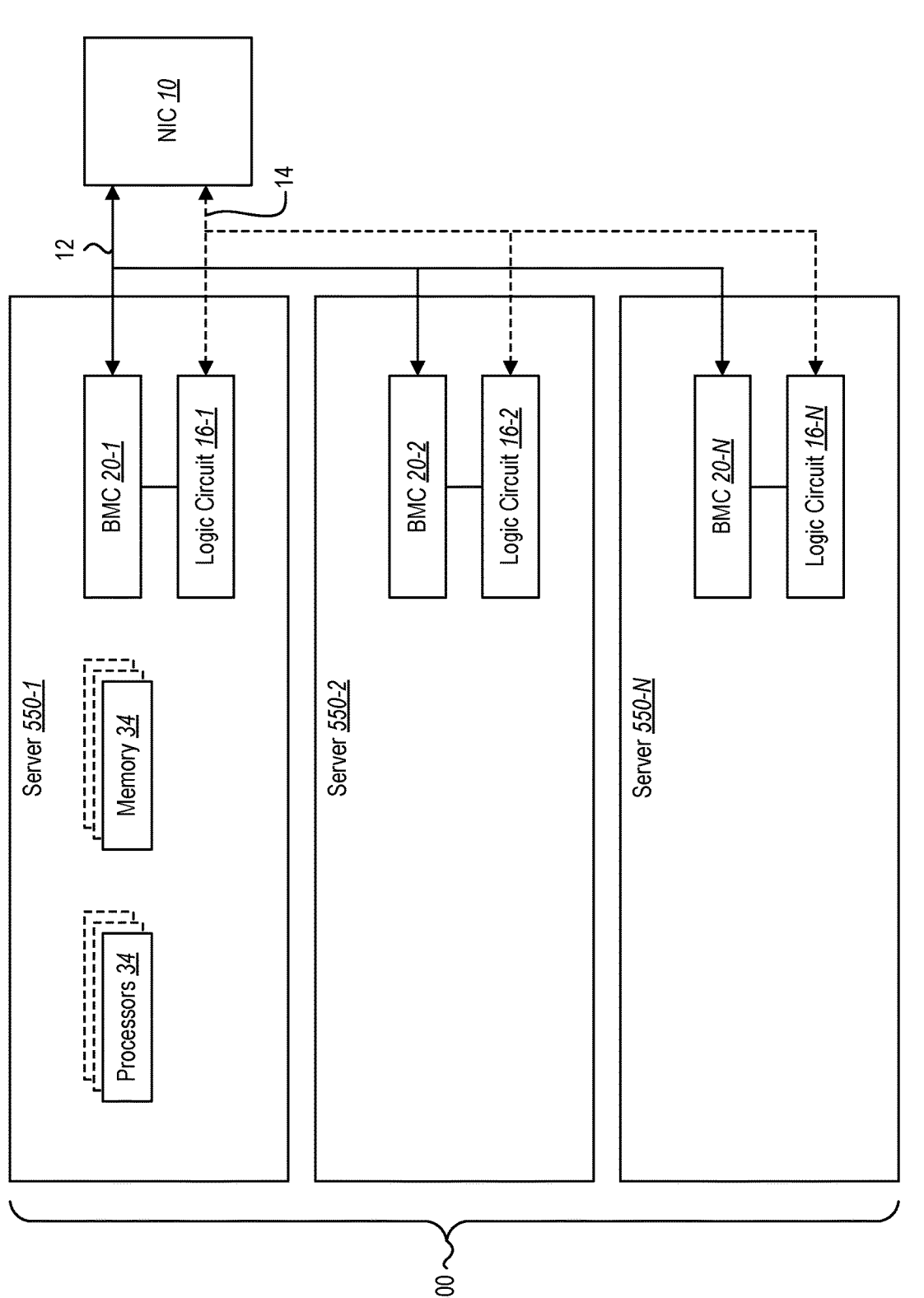
FIG. 5 illustrates an example of a cloud computing system in accordance with embodiments of the present disclosure.

FIG. 5 illustrates aspects of an example cloud computing system 500 that is configured to implement the techniques disclosed herein. The cloud computing system 500 includes a plurality of servers 550. Each of the servers 550-1, 550-2, . . . 550-N are independently configured in a similar manner to any of the computing systems described herein (e.g., the systems 200, 300, 400 shown in FIGS. 2, 3, and 4, respectively). The servers 550 may be included in one or more datacenters. In some such embodiments, the servers 550 are stacked in racks in the datacenters.

A first server 550-1 is shown with a plurality of processors 36 and a plurality of memories 34. The processors 36 and memories 34 are used to process customer workloads. The first server 550-1 also includes a BMC 20-1 that is used to manage systems operating on the first server 550-1 and/or perform various tasks on the first server 550-1. For example, the BMC 20-1 may manage the thermal controls on the first server 550-1 (e.g., temperature, fan speeds, and power usage). Another example includes the BMC 20-1 monitoring system performance and conditions (e.g., temperature, cooling fan speeds, power status, and operating system status) of the first server 550-1.

In some embodiments, the components of the first server 550-1 operate in a similar manner to the corresponding components in any of the computing systems described herein (e.g., the systems 200, 300, 400 shown in FIGS. 2, 3, and 4, respectively).

Additional servers 550-2, . . . 550-N are also shown in FIG. 5. In some embodiments, each of these servers 550-2, . . . 550-N are configured similarly to the server 550-1.

The servers 550 within the cloud computing system 500 are communicatively coupled to a management entity, such as the NIC 552. The NIC 552 is configured to perform management operations with respect to the servers 550 of the cloud computing system 500. The NIC 552 communicates directly with the BMCs 20-1, 20-2, . . . 20-N of the respective servers 550-1, 550-2, . . . 550-N.

There are at least two different communication paths between the NIC 552 and the BMCs 20-1, 20-2, . . . 20-N in the cloud computing system 500. A first communication path 12 is optionally directly established with the BMC 20-1. In some embodiments, the first communication path 12 facilitates communication between the NIC 10 and each of the BMCs 20-1, 20-2, . . . 20-N via any suitable type of connection. FIG. 5 shows the first communication path 12 facilitating communication between the NIC 10 and the BMC 20-1 on the server 550-1, the BMC 20-2 on the server 550-2, and the BMC 20-N on the server 550-N.

A sideband communication path 14 is established that facilitates communication between the NIC 10 and the logic circuits 16 on the servers 550. FIG. 5 shows the sideband communication path 14 facilitating communication between the NIC 10 and the logic circuit 16-1 on the server 550-1, the logic circuit 16-2 on the server 550-2, and the logic circuit 16-N on the server 550-N. As such, the sideband communication path 14 facilitates indirect communications between the NIC 10 and the BMCs 20-1, 20-2, . . . 20-N through the logic circuits 16-1, 16-2, . . . 16-N.

The first communication path 12 is a primary communication path between the NIC 10 and the BMCs 20-1, 20-2, . . . 20-N. The sideband communication path 14 is a sideband communication path between the NIC 10 and the BMCs 20-1, 20-2, . . . 20-N via the respective logic circuits 16-1, 16-2, . . . 16-N.

When the BMCs 20-1, 20-2, . . . 20-N are not accessible via the first communication path 12, the NIC 10 is able to communicate with the BMCs 20-1, 20-2, . . . 20-N via the sideband communication path 14 through the logic circuits 16-1, 16-2, . . . 16-N. For example, if the first BMC 20-1 of the server 550-1 becomes unresponsive via the first communication path 12, the NIC 10 is able to recover the BMC 20-1 by sending one or more control commands to the BMC 20-1 via the sideband communication path 14 to reset the BMC 20-1. Another example includes the NIC 10 distributing a firmware update to the BMCs 20-1, 20-2, . . . 20-N. In a similar example, the NIC 10 distributes a recovery command to the BMCs 20-1, 20-2, . . . 20-N. The recovery command instructs the BMCs 20-1, 20-2, . . . 20-N to return the BMC firmware to a previously known good state.

One example use case includes the second BMC 20-2 on the second server 550-2 has an error causing the fans on the second server 550-2 controlled by the second BMC 20-2 not to run. As such, the second server 550-2 is overheating and at risk for components being damaged. The server 550-2 is still processing the customer workloads properly, however, the second BMC 20-2 is providing incorrect thermal control for the second server 550-2. The NIC 10 identifies the second BMC 20-2 as operating improperly and sends a control signal to the second BMC 20-2 using the sideband communication path 14 to recover the second BMC 20-2 to a normal state or a last known good state without interrupting the customer workloads being processed by the second server 550-2. As such, the NIC 10 provides targeted recovery to the BMC 20-2 malfunctioning in the cloud computing system 500 without dropping the current workloads on the server 550-2.

Another example use case includes a plurality of the servers 550 having BMCs that have errors and are not providing the telemetry reports for the plurality of respective servers while running the customer workloads. The NIC 10 is unable to receive the telemetry data (e.g., the power usage by the servers, the thermal usage of the servers, an amount of processing power used by the virtual machines operating on the servers, an amount of memory used by the virtual machines operating on the servers, and operating system status) from the BMCs with the errors. Without the telemetry data, the NIC 10 is unable to perform load balancing between the servers 550-1, 550-2, . . . 550-N, resulting in some of the servers at the datacenter having insufficient memory, processing power, etc. to timely complete client requests. The NIC 10 identifies the plurality of BMCs (e.g., the first BMC 20-1 of the first server 550-1 and the second BMC 20-2 of the second server 550-2) with errors and send control messages to the first logic circuit 16-1 of the first server 550-1 and the second logic circuit 16-2 of the second server 550-2 using the sideband communication path 14 to recover the first BMC 20-1 and the second BMC 20-2. As such, the NIC 10 strategically recovers the plurality of BMCs with errors while maintaining the customer workloads on the respective plurality of servers 550.

Figure 6:
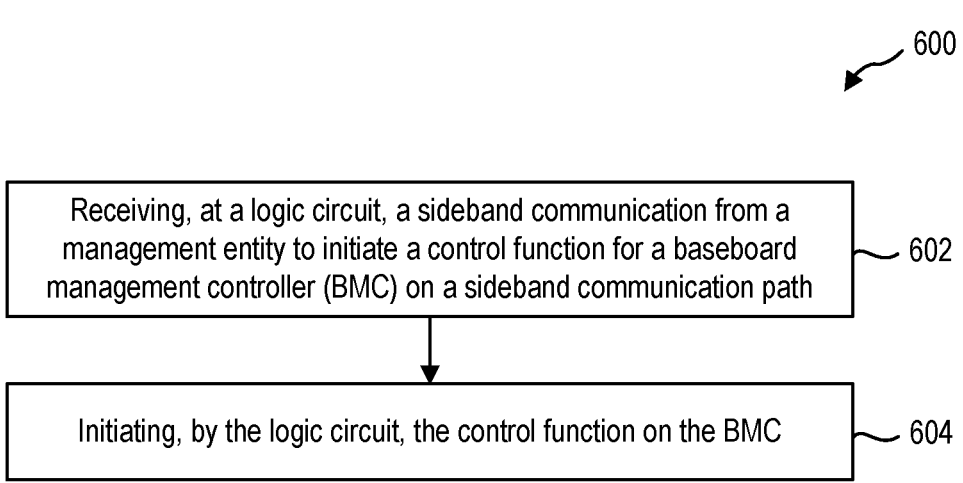
FIG. 6 illustrates an example method for recovering a BMC in accordance with embodiments of the present disclosure.

Referring now to FIG. 6, illustrated is an example method 600 for recovering a BMC. The actions of the method 600 are discussed below with reference to the architectures of FIGS. 2, 3, 4, and 5. In some embodiments, the actions of the method 600 are performed by a logic circuit 16 (as described in FIGS. 2, 3, 4).

At 602, the method 600 includes receiving a sideband communication from a management entity (e.g., management entity 10 of FIG. 2 or 3, NIC 10 of FIG. 4, or NIC 10 of FIG. 5) to initiate a control function for a BMC (e.g., BMC 20 of FIG. 2, 3, 4, or 5) on a sideband communication path (e.g., the sideband communication path 14 of FIG. 3) that is separate from a primary communication path (e.g., the primary communication path 12 of FIG. 3) between the management entity and the BMC. In some embodiments, a logic circuit (e.g., the logic circuit 16 of FIG. 4) receives the sideband communication from a NIC (e.g., the NIC 10 of FIG. 4). In some embodiments, the logic circuit (e.g., the logic circuit 16 of FIG. 2) receives a sideband communication from a management entity (e.g., the management entity 10 of FIG. 2). The logic circuit (e.g., the logic circuit 16 of FIG. 3)receives the sideband communication on a communication path (e.g., the sideband communication path 14 of FIG. 3) that is separate from a primary communication path (e.g., the primary communication path 12 of FIG. 3) between the management entity and the BMC.

At 604, the method 600 includes initiating the control function on the BMC. The logic circuit 16 (e.g., the logic circuit 16 of FIG. 3) initiates the control function on the BMC (e.g., the BMC 20 of FIG. 3).

The logic circuit 16 (e.g., the logic circuit 16 of FIG. 3) communicates the control signals (e.g., the control signals 18 of FIG. 3) to the BMC. In some embodiments, the logic circuit initiates a control function on the BMC based on the information in the control signals. In some embodiments, the control function is a recovery function that initiates a recovery of the BMC. In some embodiments, the control function initiates a reset of the BMC. In some embodiments, the control function places the BMC in a safe mode or returns the BMC to a last known good state of the BMC. In some embodiments, the control function restarts the BMC. In some embodiments, the control function initiates a diagnostic of the BMC. In some embodiments, the logic circuit sends the control signal to a reset pin (e.g., reset pin 22 of FIG. 3) on the BMC to restart the BMC (e.g., by changing the state of the reset pin from low to high or vice versa). By changing the state of the reset pin, the logic circuit restarts the BMC without physical access to the BMC. As such, the management entity remotely restarts the BMC in response to the BMC becoming inoperable or unresponsive without physical access to the computing device hosting the BMC.

In some embodiments, the logic circuit (e.g., the logic circuit 16 of FIG. 3) sends the control signal (e.g., the control signal 18 of FIG. 3) to the BMC (e.g., the BMC 20 of FIG. 3) to update or reset the BMC firmware (e.g., the BMC firmware 24 of FIG. 3), or recover to the BMC firmware to a last known good state. One example includes the logic circuit sending the control signal to the BMC to initiate a reset of the BMC firmware to an original version of the code and/or configuration for the BMC. Another example includes the logic circuit sending the control signal to the BMC to initiate operation of the BMC firmware in safe mode. Another example includes sending the control signal to the BMC to restore the BMC firmware to a last known good state or configuration of the BMC. Another example includes sending the control signal to the BMC to update the BMC firmware to a newer version. Another example includes sending the control signal to the BMC to restore the firmware to an earlier version.

In some embodiments, the control signal (e.g., the control signal 18 of FIG. 3) initiates one or more control operations on the system (e.g., power management, thermal management, system diagnostics). For example, the control signal initiates a change in cooling fan speeds on the computing device. In some embodiments, the control signal is a system diagnostic and the logic circuit initiates a diagnostic function on the system.

In some embodiments, the logic circuit (e.g., the logic circuit 16 of FIG. 3) sends the control signal (e.g., the control signal 18 of FIG. 3) directly to other devices of the system (e.g., system 300 of FIG. 3) hosting the BMC (e.g., the BMC 20 of FIG. 3) and the logic circuit. In some embodiments, the logic circuit sends the control signal directly to other components of the computing device hosting the BMC and the logic circuit. One example includes the logic circuit sending the control signal to fans (e.g., fans 32 of FIG. 3) on the computing device to control the operation speed of the fans. In such embodiments, the logic circuit acts as a spare BMC by sending a control signal directly to the fans, e.g., to prevent thermal damage to sensitive components, while the BMC is operating incorrectly or nonresponsive.

As such, the method 600 provides a remote recovery mechanism for the BMC (e.g., the BMC 20 of FIG. 3) from the management entity (e.g., the management entity 10 of FIG. 3) by using a sideband communication path (e.g., sideband communication path 14 of FIG. 3) to the BMC (e.g., the BMC 20 of FIG. 3) through the logic circuit (e.g., the logic circuit 16 of FIG. 3).

Additional explanation will now be provided about some of the terms that have been used in the foregoing discussion.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" refers to an application specific integrated circuit (ASIC), a programmable logic device (PLD), a field programmable gate array (FPGA), etc. In some embodiments, the term "processor" refers to a combination of processing devices, e.g., a combination of a DSP and a microprocessor, a plurality of microprocessors, one or more microprocessors in conjunction with a DSP core, or any other such configuration.

The term "memory" refers to any electronic component capable of storing electronic information. Examples of memory include volatile memory, non-volatile memory, and persistent memory.

Volatile memory is memory that requires power to maintain the stored information. Volatile memory retains its contents while powered on but loses its contents when the power is interrupted. Some examples of volatile memory include static random access memory (SRAM) and dynamic random access memory (DRAM).

Non-volatile memory is memory that can retain stored information even after power is removed. As used herein, the term "non-volatile memory" includes non-volatile storage. Some examples of non-volatile memory include flash memory, read-only memory (ROM), programmable read-only memory (PROM), erasable programmable read-only memory (EPROM), electrically EPROM (EEPROM), non-volatile RAM, ferroelectric RAM, magnetic computer storage devices (e.g., hard disk drives), optical storage devices, and registers.

The terms "instructions" and "code" should be interpreted broadly to include any type of computer-readable statement(s). "Instructions" and "code" comprise a single computer-readable statement or many computer-readable statements. For example, the terms "instructions" and "code" refer to one or more programs, routines, sub-routines, functions, procedures, etc.

Firmware is a specific class of computer software that provides low-level control for the hardware of a computing system. Firmware can be stored in non-volatile memory devices such as ROM, EPROM, or EEPROM. Firmware can be used to perform hardware initialization during a boot sequence of a computing system, and also to provide runtime services for operating systems and programs. Examples of firmware include the Basic Input/Output System (BIOS) and the Unified Extensible Firmware Interface (UEFI).

The term "communicatively coupled" refers to coupling of components such that these components are able to communicate with one another through, for example, wired, wireless, or other communications media. The term "communicatively coupled" can include direct, communicative coupling as well as indirect or "mediated" communicative coupling. For example, in some embodiments, a component A is communicatively coupled to a component B directly by at least one communication pathway. In some embodiments, a component A is communicatively coupled to a component B indirectly by at least a first communication pathway that directly couples component A to a component C and at least a sideband communication pathway that directly couples component C to component B. In this case, component C is said to mediate the communicative coupling between component A and component B.

Memory is said to be communicatively coupled to a processor if the processor can read information from and/or write information to the memory. Memory that is integral to a processor is communicatively coupled to the processor.

The term "determining" (and grammatical variants thereof) can encompass a wide variety of actions. For example, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The phrase "based on" does not mean "based only on," unless expressly specified otherwise. In other words, the phrase "based on" describes both "based only on" and "based at least on."

The term "interface" can refer to a shared boundary across which two or more separate components of a computing system can exchange information. An interface can include hardware component(s) and/or software component(s).

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system, comprising:
a network interface controller (NIC) with a plurality of communication paths;
a controller communicatively coupled to the NIC via a first communication path, wherein the NIC remotely monitors the controller to ensure that the controller is operating properly; and a logic circuit communicatively coupled to the NIC and the controller via a sideband communication path separate and apart from the first communication path to provide communication between the NIC and the controller, when the controller is not operating properly and, wherein the logic circuit is configured to:
receive a sideband communication from the NIC via the sideband communication path to initiate a control function on the controller, wherein the controller is malfunctioning, inoperable, or non-responsive to communications from the NIC via the first communication path;
receive, via the sideband communication path, a control operation for devices on the system;
initiate the control function on the controller; and
initiate the control operation on the devices.

2. The system of claim 1, wherein the first communication path is a primary communication path between the NIC and the controller, and the sideband communication path is a redundant path between the NIC and the controller.

3. The system of claim 1, wherein the controller is a baseboard management controller (BMC).

4. The system of claim 1, wherein the NIC is a network interface controller (NIC) with dual communication paths.

5. The system of claim 1, wherein the control function is a recovery function that initiates a recovery of the controller.

6. The system of claim 5, wherein the control function initiates a reset of the controller.

7. The system of claim 5, wherein the control function places the controller in a safe mode or returns the controller to a last known good state of the controller.

8. The system of claim 5, wherein the control function restarts the controller.

9. The system of claim 1, wherein the control function initiates a diagnostic of the controller.

10. A system, comprising:
a network interface controller (NIC) management entity with a plurality of communication paths;
a baseboard management controller (BMC) communicatively coupled to the NIC management entity via a first communication path; and
a logic circuit communicatively coupled to the BMC and the NIC management entity via a sideband communication path that is separate and apart from the first communication path, wherein the logic circuit is configured to:
receive a communication from the NIC management entity via the sideband communication path to initiate a control function on the BMC, wherein an error occurred on the BMC;
receive, via the sideband communication path, a control operation for devices on the system;
initiate the control function on the BMC; and
initiate the control operation on the devices.

11. The system of claim 10, wherein the error causes the BMC to operate incorrectly.

12. The system of claim 10, wherein the error causes the BMC to become non-responsive.

13. The system of claim 10, wherein the BMC further comprises a reset pin; and
the logic circuit initiates the control function on the BMC by generating a signal on the reset pin to change a state of the reset pin and restart the BMC.

14. The system of claim 10, wherein the BMC further comprises firmware; and the logic circuit initiates the control function on the BMC by generating a signal to revert the firmware, flash the firmware, or update the firmware.

15. The system of claim 10, wherein the management entity is a network interface controller (NIC).

16. The system of claim 15, wherein the first communication path is a primary communication path between the NIC and the BMC.

17. The system of claim 15, wherein the sideband communication path comprises an Inter-Integrated Circuit (I2C) communication path between the NIC and the logic circuit.

18. A method, comprising:

receiving, at a logic circuit, a sideband communication from a network interface controller (NIC) management entity to initiate a control function for a baseboard management controller (BMC) on a sideband communication path that is separate and apart from a primary communication path between the NIC management entity and the BMC;

receiving, via the sideband communication path, a control operation for devices on the system;

initiating, by the logic circuit, the control function on the BMC; and initiating, by the logic circuit, the control operation on the devices.

19. The method of claim 18, wherein initiating the control function on the BMC further includes:

generating a signal on a reset pin of the BMC to change a state of the reset pin and restart the BMC; or generating a signal revert firmware of the BMC, flash the firmware of the BMC, or update the firmware of the BMC.

20. The method of claim 18, wherein the NIC management entity is a network interface controller (NIC), and the sideband communication path comprises an Inter-Integrated Circuit (I2C) communication path between the NIC and the logic circuit.

* * * * *